United States Patent [19]

Matsuno et al.

[11] Patent Number: 4,701,982
[45] Date of Patent: Oct. 27, 1987

[54] CLAMP BAND

[75] Inventors: Yutaka Matsuno, Toyota; Tadanobu Kumagai, Okazaki; Hatsuyuki Tanaka, Chino, all of Japan

[73] Assignees: Toyota Jidosha Kabushiki Kaisha, Toyota; Kabushiki Kaisha Mihama Seisakusho, Chino, both of Japan

[21] Appl. No.: 910,823

[22] Filed: Sep. 23, 1986

Related U.S. Application Data

[63] Continuation of Ser. No. 695,218, Jan. 25, 1985, abandoned.

[30] Foreign Application Priority Data

Jan. 27, 1984 [JP]  Japan .................................. 59-9136

[51] Int. Cl.⁴ ............................................ B65D 63/00
[52] U.S. Cl. .................................. 24/273; 24/71 ST; 24/19
[58] Field of Search ............... 24/273, 19, 20 R, 71 R, 24/68 R, 71 SB, 71 TD, 71 CT, 71 A, 71 T, 71 TT, 71 ST; 30/340

[56] References Cited

U.S. PATENT DOCUMENTS

| | | | |
|---|---|---|---|
| 1,012,345 | 12/1911 | Ferguson | 24/19 |
| 2,449,798 | 9/1948 | Weber | 24/71 ST X |
| 2,841,855 | 7/1958 | Weber | 24/273 |
| 3,797,077 | 3/1974 | Omori et al. | 24/273 |
| 4,335,509 | 6/1982 | Smith | 30/340 X |

Primary Examiner—Kenneth J. Dorner
Assistant Examiner—Laurie K. Cranmer
Attorney, Agent, or Firm—Oblon, Fisher, Spivak, McClelland, & Maier

[57] ABSTRACT

A clamp band which includes a strip member having an intermediate portion formed to substantially conform to the outline of an article to be fastened and two ends projected outward from the intermediate portion and a lever member welded to the two ends of the strip member. One of the two ends of the strip member extends approximately tangentially from the intermediate portion and the other extends to make an acute angle. The lever member is welded to the outside of the end located nearer the intermediate portion of the these ends when two ends of the strip member are brought down. The lever member is formed to contact closely an outer peripheral surface of the strip member and has high hardness edge portions extending longitudinally thereof.

2 Claims, 6 Drawing Figures

CLAMP BAND

This application is a continuation of application Ser. No. 695,218, filed Jan. 25, 1985, now abandoned.

BACKGROUND OF THE INVENTION

1. Field of the Invention

This invention relates to a clamp band, and more particularly to a clamp band consisting of a strip member and a lever member.

2. Description of the Prior Art

There is provided a clamp band consisting of a strip member the intermediate portion of which is formed into a shape, for example circular one, substantially conforming to the outline of an article to be fastened and a lever member which is welded to two ends of the strip member projecting outward from said intermediate portion. This clamp band has the outer diameter of the intermediate portion squeezed by bringing down the lever member to fasten the article, and firmly secures to the intermediate portion the lever member located along the outside of the intermediate portion after bringing down the lever member to prevent the looseness of the band so that the article is held air-tight or liquid-tight.

SUMMARY OF THE INVENTION

Since in said clamp band the sealing effect of the article to be fastened in the intermediate portion of the strip member may be degraded unless the ends of the strip member are close to the outer peripheral surface of the intermediate portion of the strip member under the fastened condition of the article, the lever member is formed of a material with as as thin a thickness as possible. As a result, when the clamp band is placed around said article and fastens it by bringing down the lever member, the lever member tends to be bent to provide a defective incorporating property. When the lever member is formed of a material with high hardness to avoid such defects, the welding property of the lever member to the strip member is degraded to cause welding cracks or the like.

Accordingly, an object of the present invention is to provide a clamp band which ensures the sealing effect by using a lever member with a thickness as thin as possible and can further prevent the lever member from bending to improve the incorporating property and prevent the welding property from degradation.

The clamp band according to the present invention comprises a strip member having an intermediate portion formed into a shape substantially conforming to the outline of an article to be fastened and two end portions projecting outward from said intermediate portion and a lever member welded to said two end portions of the strip member, edge portions of said lever member extending longitudinally thereof having high hardness.

According to the present invention, since the edge portions of the lever member has high hardness, the lever member is not bent in fastening the article, and the article can be rapidly and securely fastened. Also, since a large force can be applied to the lever member in the fastening of the article, the clamp band having a large fastening allowance which was conventionally difficult to provide can also effectively used. Further, since deformation of the lever member is also prevented and the lever member can be held as it is formed, the shape of the lever member after fastening the article is stabilized to improve safety and incorporating property while giving no possibility of damaging the article to be fastened by the lever member.

Other objects and features of the present invention will become apparent from the following description of a preferred embodiment of the invention with reference to the accompanying drawings.

DESCRIPTION OF THE PREFERRED EMBODIMENT

Figure 1:
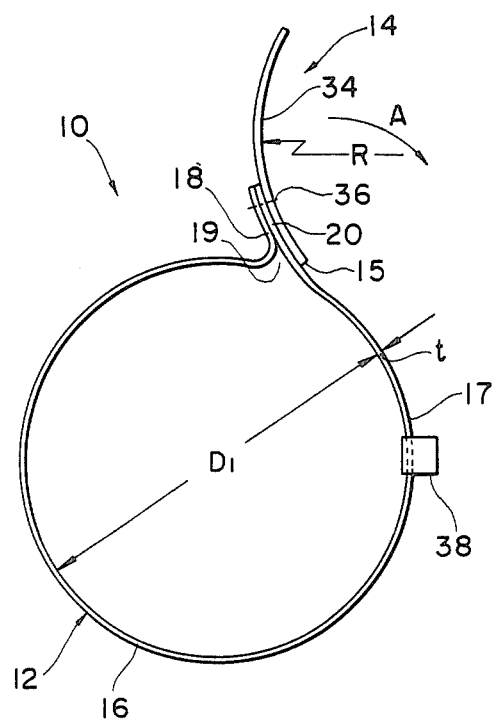
FIG. 1 is a front view showing a clamp band according to the present invention before it fastens an article.
Figure 2:
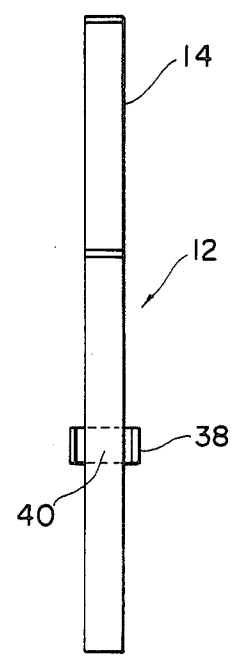
FIG. 2 is a side view showing the same.
Figure 3:
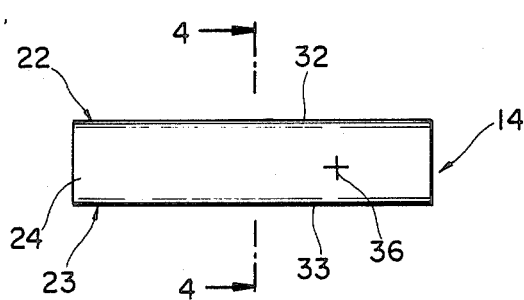
FIG. 3 is a plan view showing a lever member.

A clamp band 10 comprises a strip member 12 and a lever member 14 as shown in FIGS. 1 and 2.

The strip member 12 is constituted of a small elongated member with small thickness. This strip member 12 is formed of a material having high tensile strength and flexibility such as spring steel, stainless steel or the like. An intermediate portion 16 of the strip member 12 is formed to conform substantially to the outline of an article to be fastened (for example a boot for covering a drive shaft shown in FIG. 6). In an embodiment shown in the drawing, the intermediate portion 16 is shaped substantially into circular form having the diameter $D_1$. Here, "substantially" means the fact that a portion 19 which does not conform to the outline of the article is formed in a position opposed to the overlapped portion of two ends 18, 20 of the strip member 12.

Two ends 18, 20 of the strip member 12 extend radially outward of the circle formed by the intermediate portion 16. In the embodiment shown in the drawing, one end 20 extends approximately tangentially and the other end 18 is bent at an acute angle to extend along the end 20. The ends 18, 20 may extend otherwise outward in the direction orthogonal to the tangent of the circle. However, in the embodiment shown, the fastening allowance can be increased and a larger fastening force can be given to the article by such increment.

The lever member 14 is formed of a material such as iron having a small thickness and shaped to contact closely an outer peripheral surface 17 of the intermediate portion 16 of the strip member 12. In the embodiment shown, the lever member 14 is formed into an arc having a radius R which is $D_2/2+t$ (where $D_2$ is the inner diameter of the strip member 12 after fastening and t is the thickness of the strip member 12). The length of the lever member 14 is determined such that the lever member 14 contacts closely the outer peripheral surface 17 of the intermediate portion of the strip member 12 within the range of $30° \sim 60°$.

Figure 4:
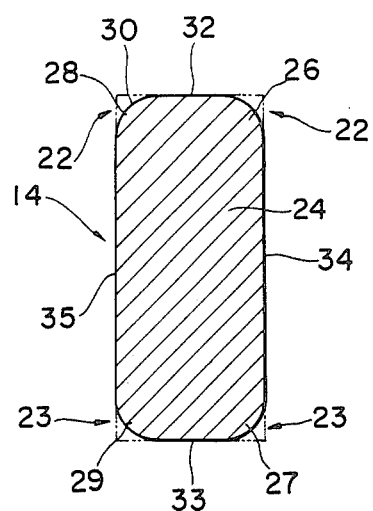
FIG. 4 is an enlarged sectional view taken along line 4—4 of FIG. 3.

The lever member 14 is formed such that the edge portions 22, 23 extending parallel to a longitudinal axis of lever member 14 have a hardness higher than that of the other portion 24. In the embodiment shown in FIG. 4, right angle portions shown by the phantom line of four corners 26, 27, 28 and 29 of the lever member 14 are squeezed inward longitudinally over the entire length of said edge portions to form convex curved surfaces 30 which are hardened to provide edge portions 22, 23 of a cross-section of the lever member with high hardness. In such working and hardening, the lever member 14 can be hardened only through a dies provided in the corners with curved surface so that cost of hardening can be kept as low as possible.

Hardening of the thickness dimension of at most several mm from the surface will do, and when the edge portions 22, 23 have hardness about 20~50% higher than unhardened portion 24, they can be used satisfactorily. The edge portions 22, 23 can be hardened also by surface hardening from side surfaces 32, 33 of the lever member 14. Also, the edge portions may be hardened at either one of peripheral surfaces 34, 35 of the lever member 14. In this case, the edge portion has preferably hardness higher than said one.

Two ends 18, 20 of the strip member 12 are welded to the lever member 14. In the embodiment shown, two ends 18, 20 are overlapped on each other and the lever member 14 is applied on the end 20 so that two ends are spot welded to the lever member at the widthwise central position 36 of the lever member 14. Since the position 36 of the lever member 14 is not hardened, it is easy to weld and any welding cracks are not produced in the lever member 14. Also, the lever member 14 is difficult to deform since its edge portions 22, 23 are hardened. Therefore, even if the lever member 14 is welded at the position 36 and the peripheral portion of the position 36 is hardened to produce any local strain, the whole shape of the lever member 14 is only slighty deformed and thus the radius R is kept constant so that the close contact between the peripheral surface 34 of the lever member 14 and the outer peripheral surface 17 of the strip member 12 can be held satisfactorily.

Figure 5:
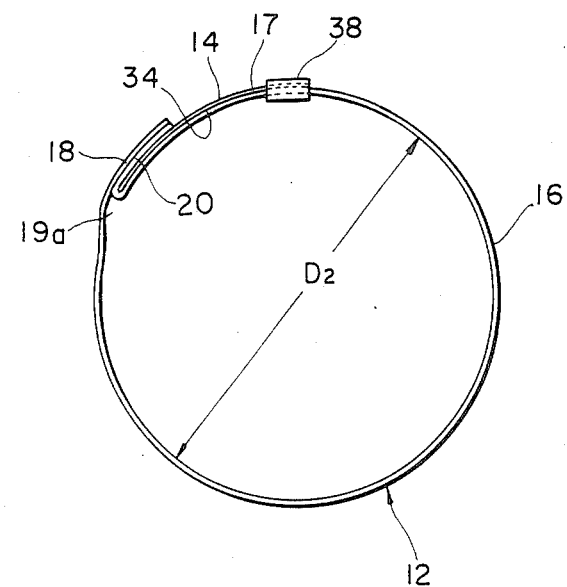
FIG. 5 is a front view showing the clamp band after fastening the article.
Figure 6:
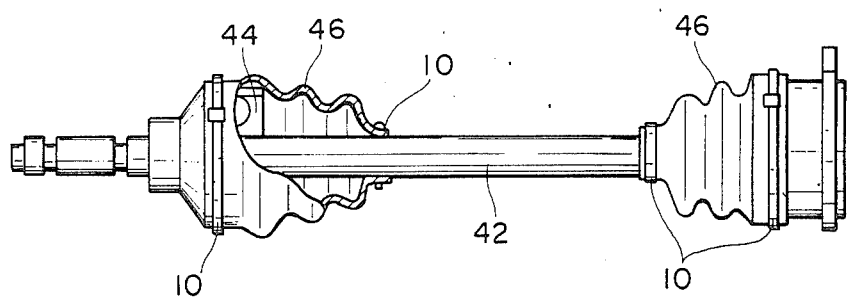
FIG. 6 is a front view showing an embodiment of the clamp band used according to the present invention.

A buckle 38 is constituted from a member having a channel-shaped section, and spot welded to a position 40 on lever 14 where it can be positioned over the end of the lever member 14 into the fastening condition in the intermediate portion 16 of the strip member 12.
Operation of the embodiment The clamp band 10, as shown in FIG. 6 for example, is placed around a boot 46 covering a constant velocity universal joint 44 of a drive shaft 42, and the lever member 14 is brought down in the direction A (FIG. 1). Then, the lever member 14 is turned about the end face 15 while the outer diameter of the intermediate portion 16 of the strip member 12 is squeezed. As shown in FIG. 5, when the peripheral surface 34 of the lever member 14 contacts closely the outer peripheral surface 17 of the intermediate portion 16 of the strip member 12, the inner diameter of the intermediate portion 16 becomes $D_2$ and fastening allowance $D_1-D_2$ fastens the boot 46. In this case, since the thickness of the lever member 14 is small, a portion 19a between the end 18 of the strip member 12 and the boot becomes sufficiently small to improve the sealing effect of the article in this portion. After bringing down the lever member 14, the buckle 38 is caulked to fix the end of the lever member 14 and the fastening operation of the clamp band 10 is completed.
Another embodiments One of two ends of the strip member 12 is first fixed to the other end by welding or other methods and then one or the other end may be welded to the lever member 14. The welding of the lever member to two ends of the strip member means the inclusion of this case.

To firmly secure the lever member to the intermediate portion of the strip member after bringing down the lever member 14, the end of the lever member may be formed to have a width larger than the strip member and caulked.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A clamp band, comprising:
   a strip member having an intermediate portion formed to substantially conform to an outline of an article to be fastened and two ends projecting outward from said intermdeiate portion; and
   a lever member having a substantially rectangular cross-sectional shape of which a plurality of cross-sectional inwardly compressed corner means minimize deformation of said lever member when said lever member is in use and extend parallel to a longitudinal axis thereof and are located at junctions between side surfaces of said rectangular cross-sectional shape;
   wherein said inwardly compressed corner means of the lever member have a hardness greater than remaining portions of the lever member, and wherein said lever member is welded to said two ends of the strip member at said remaining portions.

2. A clamp band as claimed in claim 1, further comprising a buckle connected to said strip member so as to fix an end portion of said lever member to said buckle.

* * * * *